(12) United States Patent
Nakao et al.

(10) Patent No.: US 6,830,606 B2
(45) Date of Patent: Dec. 14, 2004

(54) METHOD FOR DECARBONIZATION REFINING OF CHROMIUM-CONTAINING MOLTEN STEEL

(75) Inventors: Ryuji Nakao, Hikari (JP); Tomoaki Tanaka, Hikari (JP); Masao Igarashi, Hikari (JP); Koichiro Yoshino, Hikari (JP)

(73) Assignee: Nippon Steel Corporation, Tokyo (JP)

(*) Notice: Subject to any disclaimer, the term of this patent is extended or adjusted under 35 U.S.C. 154(b) by 0 days.

(21) Appl. No.: 10/482,560

(22) PCT Filed: Jul. 1, 2002

(86) PCT No.: PCT/JP02/06651

§ 371 (c)(1),
(2), (4) Date: Dec. 30, 2003

(87) PCT Pub. No.: WO03/004707

PCT Pub. Date: Jan. 16, 2003

(65) Prior Publication Data
US 2004/0182203 A1 Sep. 23, 2004

(30) Foreign Application Priority Data

Jul. 2, 2001 (JP) .................................. 2001-200474
Nov. 2, 2001 (JP) .................................. 2001-337291

(51) Int. Cl.$^7$ ............................................. C21C 7/068
(52) U.S. Cl. ........................... 75/378; 75/382; 75/384; 706/904
(58) Field of Search ...................... 75/382, 384, 378; 706/904

(56) References Cited

U.S. PATENT DOCUMENTS 3,816,720 A * 6/1974 Bauer et al. ................... 75/382
5,327,357 A * 7/1994 Feinstein et al. ............. 700/271
5,540,753 A * 7/1996 Takano et al. ................. 75/551

FOREIGN PATENT DOCUMENTS

| JP | 61195913 | 8/1986 |
| JP | 7233409 | 9/1995 |
| JP | 1068013 | 3/1998 |
| JP | 11124618 | 5/1999 |
| JP | 11350018 | 12/1999 |
| JP | 2001323315 | 11/2001 |

* cited by examiner

Primary Examiner—Melvyn Andrews
(74) Attorney, Agent, or Firm—Baker Botts L.L.P.

(57) ABSTRACT

The present invention: solves the problems of hitherto disclosed technologies, such as insufficient suppression of the oxidation loss of [Cr] and the excessive erosion of refractories, in the decarburization-refining of chromium-contained molten steel under a normal or reduced pressure; and is characterized by: determining, in sequence; a molten steel temperature during the refining through actual measurement or computation from a molten steel temperature before the refining and refining conditions; [C] and [Cr] concentrations during the refining through actual measurement or computation from molten steel components before the refining and refining conditions; a CO partial pressure $P_{CO}$ in an atmosphere during the refining from the total pressure P of the atmosphere, an oxygen gas supply rate and an inert gas supply rate, a Hilty's equilibrium temperature $T_H$ from said [C] and [Cr] concentrations and $P_{CO}$; the difference $\Delta T$ between said molten steel temperature during the refining and said Hilty's equilibrium temperature $T_H$: and controlling the refining conditions so that said $\Delta T$ is equal to a prescribed value or higher.

18 Claims, 4 Drawing Sheets

METHOD FOR DECARBONIZATION REFINING OF CHROMIUM-CONTAINING MOLTEN STEEL

CROSS-REFERENCE TO RELATED APPLICATION(S)

This application is a national stage application of PCT Application No. PCT/JP02/06651 which was filed on Jul. 1, 2002, and published on Jan. 16, 2003 as International Publication No. WO 03/004707 (the "International Application"). This application claims priority from the International Application pursuant to 35 U.S.C. § 365. The present application also claims priority under 35 U.S.C. § 119 from Japanese Patent Application Nos. 2001-200474 and 2001-337291, filed on Jul. 2, 2001 and Nov. 2, 2001, respectively, the entire disclosures of which are incorporated herein by reference.

FIELD OF THE INVENTION

The present invention relates to a method for reducing the oxidation loss of chromium and the wear of refractories, by performing refining in accordance with a molten steel temperature and a [C] concentration, in decarburization-refining of chromium-contained steel under a normal or reduced pressure.

BACKGROUND INFORMATION

Methods for refining molten steel in accordance with a [C] concentration in the decarburization-refining of chromium-contained molten steel containing chromium by 11 mass % or more like stainless steel are know. One such method is a dilution-decarburizing method using which a CO gas partial pressure ($P_{CO}$) in an atmosphere is reduced by injecting a dilution gas together with oxygen gas (hereunder referred to simply as "oxygen") on and after the middle period of decarburization (for example, when a [C] concentration is 0.7 mass % or less). Another such method is a vacuum-decarburizing method, wherein molten steel is charged into a ladle and treated with the interior of the ladle depressurized. The former method is generally called the AOD method or the top-and-bottom blown converter method and the latter method the VOD method.

Further, as described in Japanese Patent Publication Nos. H3-68713 and H4-254509, the vacuum AOD method is used with which depressurized refining is applied on the way of decarburization in the AOD method has been employed recently. In the vacuum AOD method, the amount of supplied oxygen and the degree of vacuum are adjusted in accordance with a [C] concentration in the same way as in the VOD method.

Any of these methods may be intended to efficiently promote decarburization while the oxidation loss of [Cr] in molten steel is suppressed. However, in any of such conventional methods, the increase of the oxidation of [Cr] in proportion to the decrease of a [C] concentration cannot be avoided and thus the amount of the oxidation of [Cr] increases.

To suppress the oxidation loss of [Cr] in molten steel, in the VOD method for example, the amount of supplied oxygen and the degree of vacuum (not more than 100 Torr) are hitherto adjusted in accordance with the progress of decarburization as described in Japanese Patent Publication Nos. S55-89417 and S55-152118. Further, in the AOD method, the ratio of dilution gas is increased in accordance with the decrease of a [C] concentration, or the vacuum refining is applied on the way of decarburization.

In one of the above methods and, for example, in the method using which the ratio of dilution gas is increased in accordance with the decrease of a [C] concentration, when the ratio of dilution gas is increased excessively in an attempt to prevent the oxidation of [Cr], this causes excessive consumption of an expensive dilution gas and therefore an increase in the refining cost. In contrast, when it is attempted to reduce the amount of dilution gas, the oxidation loss of [Cr] cannot be avoided sufficiently.

Further, when chromium-contained molten steel is subjected to decarburization-refining by the VOD method, the AOD method or the vacuum AOD method, it takes a long time for the measurement of a molten steel temperature and the sampling and chemical analysis of the molten steel. For that reason, in practice, the measurement of a molten steel temperature is performed intermittently or is not performed and the concentration of [C] in the molten steel is not analyzed continuously and, therefore, the refining operation conforming to a molten steel temperature and a [C] concentration may not be carried out sufficiently. As a consequence, in actual operation, $P_{CO}$ is lowered excessively, namely the degree of vacuum is increased excessively, or a dilution gas is injected abundantly, the oxidation of [Cr] and the erosion of refractories are not suppressed sufficiently, and thus the refining cost increases and the productivity lowers as a result of the decrease in an oxygen supply rate.

As a method for solving the problem of the molten steel temperature measurement among the aforementioned problems, a refining method has been described in Japanese Patent Publication No. H11-124618. Using this method, it is possible to measure the temperature of chromium-contained molten steel continuously, to control the ratio of oxygen gas to the injected gas and the addition amounts of alloys, coolants and auxiliary materials in accordance with the measured molten steel temperature, to reduce the oxidation loss of [Cr], and to mitigate the erosion of refractories of a refining furnace.

In this method, however, the transition of a decarburization oxygen efficiency (the rate of the blown oxygen gas consumed for decarburization, hereunder referred to as "decarburization oxygen efficiency η") during blowing and a [C] concentration in molten steel are likely not obtained accurately, thus the control of refining in the operation under a reduced pressure is particularly insufficient, and, as a result, the oxidation loss of [Cr] is still large and the productivity is not improved sufficiently.

SUMMARY OF THE INVENTION

The present invention is provided to address the problems of the conventional technologies, such as insufficient suppression of the oxidation loss of [Cr] and the excessive erosion of refractories, in the decarburization-refining of chromium-contained molten steel under a normal or reduced pressure. One of the objects of the present invention is to reduce the oxidation loss of [Cr] and the erosion of refractories by determining the optimum refining conditions on the basis of a molten steel temperature, molten steel components and gas blowing conditions determined by actual measurement or assumption. Another object of the present invention is to reduce the oxidation loss of [Cr] and the erosion of refractories by using a means for measuring a molten steel temperature continuously, determining a decarburized amount continuously, estimating a [C] concentration in molten steel, and refining the molten steel in accordance with the molten steel temperature and the [C] concentration.

In a thermodynamic equilibrium, a Hilty's equilibrium temperature, a Chipman's equilibrium temperature and a Fuwa et al's equilibrium temperature are known as a molten steel temperature T that balances with [C] and [Cr] concentrations (mass %) in molten steel and a CO partial pressure ($P_{CO}$, atm.) in an atmosphere. Among those, a Hilty's equilibrium temperature $T_H$ (K) is adopted in the present invention because it is widely used. A Hilty's equilibrium temperature $T_H$ (K) is described by the following formula (5):

$$T_H=\{-13,800/(-8.76+\log([C]P_{CO}/[Cr]))\} \qquad (5).$$

It has been determined that, when refining was controlled so that the difference between a molten steel temperature T and a Hilty's equilibrium temperature is approximately equal to a prescribed value or higher than the prescribed value in the refining of chromium-contained molten steel, specifically when refining was controlled so that $P_{CO}$ in an atmosphere and a molten steel temperature is adjusted on the basis of the transitions of [C] and [Cr] concentrations in the molten steel, the oxidation loss of [Cr] could be suppressed to the minimum and the erosion of refractories could be prevented without an excessive use of inert gas and an excessive increase of the molten steel temperature.

Further, in the control of refining based on a Hilty's equilibrium temperature, the accuracy of the refining control improves as the accuracy of the estimation of [C] and [Cr] concentrations during the refining improves. A method according to the present invention is provided for estimating [C] and [Cr] concentrations with high accuracy.

According to one exemplary embodiment of the present invention, a method is provided for decarburization-refining chromium-contained molten steel under an atmospheric or a reduced pressure by blowing oxygen gas and inert gas into the molten steel a molten steel temperature is determined, in sequence, during the refining through actual measurement or computation from a molten steel temperature before the refining and refining conditions. [C] and [Cr] concentrations are determined during the refining through actual measurement or computation from molten steel components before the refining and refining conditions a CO partial pressure $P_{CO}$ in an atmosphere is determined during the refining from the total pressure P of the atmosphere. An oxygen gas supply rate and an inert gas supply rate is further determined. A Hilty's equilibrium temperature $T_H$ is obtained from the [C] and [Cr] concentrations and $P_{CO}$. The difference $\Delta T$ between the molten steel temperature is determined during the refining. Further, the Hilty's equilibrium temperature $T_H$: and controlling the refining conditions are obtained so that the $\Delta T$ is equal to a prescribed value or higher than the prescribed value.

The [C] and [Cr] concentrations can be determined during the refining through computation from molten steel components before the refining. In addition, a supplied oxygen amount can be determined as the total oxygen amount of oxygen gas and solid oxygen source, the transition of oxygen gas ratio to blown gas and the past refining data. The determinations of [C] and [Cr] concentrations during the refining through computation can be further performed with the analysis result of exhaust gas. Further, the [C] and [Cr] concentrations can be determined, in sequence, during the refining through the computation processes of: setting the [C] and [Cr] concentrations before the refining as the initial concentrations; and repeating the processes of determining a decarburization oxygen efficiency $\eta$ as the function of the difference $\Delta T$. A decarburization rate and a [Cr] oxidation rate can be determined from the decarburization oxygen efficiency $\eta$ and an oxygen gas supply rate, and the [C] and [Cr] concentrations may be revised.

The process of the decarburization-refining under a reduced pressure can be divided into three terms composed of a term from the commencement of decompression to the commencement of oxygen gas blow (a natural decarburization term), a term during which an oxygen gas ratio to blown gas is 20% or more after the natural decarburization term (an oxygen decarburization term), and a term during which an oxygen gas ratio to blown gas is less than 20% after the natural decarburization term (a diffusive decarburization term.

In the natural decarburization term, an [O] concentration is determined, in sequence, before the commencement of the decompression from a [C] concentration in the molten steel before the commencement of the decompression, a [C] activity (ac) in the molten steel and a molten steel temperature is determined before the commencement of the decompression; a decarburized amount is determined during the natural decarburization term as a function of the [O] concentration before the commencement of the decompression; and a [Cr] concentration is determined as a function of the decarburized amount during the natural decarburization term.

In the oxygen decarburization term, the [C] and [Cr] concentrations are determined, in sequence, during the refining through computation processes of: (i) setting the [C] and [Cr] concentrations at the time of the commencement of the oxygen decarburization term as the initial concentrations, and (ii) repeating the processes of determining a decarburization oxygen efficiency $\eta$ as the function of said difference $\Delta T$, determining a decarburization rate and a [Cr] oxidation rate from the decarburization oxygen efficiency $\eta$ and an oxygen gas supply rate, and revising said [C] and [Cr] concentrations.

In the diffusive decarburization term, the variation of the logarithmic value of the [C] concentration is determined from the commencement of the diffusive decarburization term as a function proportional to a time period t from the commencement of the diffusive decarburization term, and the [Cr] concentration is determined as a function of an oxygen supply rate and a decarburization rate.

According to another exemplary embodiment of the present invention, the following formula is used for determining a decarburization rate $\Delta[C]$ and a [Cr] oxidation rate $\Delta[Cr]$ from said decarburization oxygen efficiency $\eta$ and an oxygen gas supply rate $q_T$ and revising [C] and [Cr] concentrations:

$$\Delta[C]=\eta \times q_T \times (1-R) \times 12/11.2/(10 \times Wm) \qquad (1), \text{ and}$$

$$\Delta[Cr]=(1-\eta) \times q_T \times (1-R) \times 104/33.6/(10 \times Wm) \qquad (2),$$

where, $\Delta[C]$ and $\Delta[Cr]$ are the variations of [C] and [Cr] per unit time (mass %/min.), $q_T$ is an oxygen gas supply rate per unit time (Nm³/min.), R a secondary combustion rate (−), and Wm a molten steel amount (ton).

According to still another exemplary embodiment of the present invention, the CO partial pressure $P_{CO}$ in an atmosphere is determined during the refining from a total pressure P, an oxygen gas supply rate $q_T$ and an inert gas supply rate $q_d$ using the following formula (3):

$$P_{CO}=P \times 2 \times q_T/(2 \times q_T+q_d) \qquad (3).$$

In a further exemplary embodiment, a value computed through the following formula is used as the Hilty's equilibrium temperature $T_H$:

$$T_H=\{-13,800/(-8.76+\log([C]P_{CO}/[Cr]))\} \qquad (5),$$

where, the units of the parameters are; K for $T_H$, mass % for [C] and [Cr], and atm. for $P_{CO}$.

In addition, refining conditions are determined so that $\Delta T$ may be 0° C. or more when a [C] concentration in the molten steel is 0.5 mass % or more, 30° C. or more when the same is 0.2 mass % or more, and 50° C. or more when the same is lower than 0.2 mass %. The $\Delta T$ can be controlled by the control of a molten steel temperature when a [C] concentration in the molten steel is 0.5 mass % or more. The $\Delta T$ can also be controlled by the control of the pressure in a refining vessel when a [C] concentration in the molten steel is in the range from 0.2 to 0.5 mass %. Further, the $\Delta T$ may be controlled by the control of the pressure in a refining vessel and an oxygen gas ratio to blown gas when a [C] concentration in the molten steel is less than 0.2 mass %.

According to a further exemplary embodiment of the present invention, in the event of continuously measuring the temperature of said molten steel from the commencement of the decompression and continuously determining a decarburized amount ($\Delta[\%C]$) and a [C] concentration ([%C]) by using the measured molten steel temperature, certain actions are taken. For example, in a term from the commencement of the decompression to the commencement of oxygen gas blow (a natural decarburization term), the following are determined in sequence: (i) an [O] concentration ([O]cal) before the commencement of the decompression from a [C] concentration ([%C]s) in the molten steel before the commencement of the decarburization, a [C] activity (ac) in the molten steel and the measured molten steel temperature (T) before the commencement of the decompression, and (ii) a decarburized amount ($\Delta[\%C]$) as a function of said [O]cal.

In addition, in a term during which an oxygen gas ratio to blown gas is 20% or more after the natural decarburization term (an oxygen decarburization term), the following are determined, in sequence: (i) a CO partial pressure $P_{CO}$ in an atmosphere at the time of the temperature measurement from the degree of vacuum (P) at the time of the temperature measurement, the total amount of oxygen gas ($Q_T$) blown during the temperature measurement span and the total amount of dilution gas ($Q_d$) blown during the temperature measurement span; (ii) a Hilty's equilibrium temperature from a computed [C] concentration ([%C]) in the molten steel, a computed [Cr] concentration ([%Cr]) in the molten steel and said $P_{CO}$; (iii) the difference ($\Delta T$) between the measured molten steel temperature T and said determined Hilty's equilibrium temperature; (iv) the ratio ($\eta$) of oxygen gas consumed for decarburization to blown oxygen gas as a function of said $\Delta T$; the amount of oxygen gas ($Q_{O2}$) consumed for decarburization during the temperature measurement span from said $\eta$ and $Q_T$ and a secondary combustion ratio (R); and (v) a decarburized amount ($\Delta[\%C]$) from said $Q_{O2}$ and a molten steel amount (Wm).

Further, in a term during which an oxygen gas ratio to blown gas is less than 20% after the natural decarburization term (a diffusive decarburization term), the variation of the logarithmic value (log[%C]) of the [C] concentration [%C] is determined from the commencement of the diffusive decarburization term as a function proportionate to a time period t from the commencement of the diffusive decarburization term.

According to still another exemplary embodiment of the present invention, in a term from the commencement of the decompression to the commencement of oxygen gas blow (a natural decarburization term), the following determinations are performed: (i) an [O] concentration ([O]cal) before the commencement of the decompression through the formulae ② and ③ provided below; and a carburized amount ($\Delta[\%C]$) through the following formula ① also provided below: (ii) in a term during which an oxygen gas ratio to blown gas is 20% or more after the natural decarburization term (an oxygen decarburization term), in sequence; a CO partial pressure $P_{CO}$ in an atmosphere at the time of the temperature measurement through the following formula ⑧; the difference ($\Delta T$) between the measured molten steel temperature T and said determined Hilty's equilibrium temperature through the formula ⑦ provided below; (iii) a ratio ($\eta$) of oxygen gas consumed for decarburization to blown oxygen gas through the formula ⑥ provided below; and (iv) a decarburized amount ($\Delta[\%C]$) through the following formula ④: and 3) in a term during which an oxygen gas ratio to blown gas is less than 20% after the natural decarburization term (a diffusive decarburization term), determining the variation of the logarithmic value (log[%C]) of the [C] concentration [%C] through the formula ⑨ provided below:

$$\Delta[\%C] = a \times [O]cal + b \qquad ①$$

$$[O]cal = c + d \times [O]e \times 10^{fo/To + g \times \log[\%C]s + h} \qquad ②$$

$$[O]e = 1/(ac \times fo) \times 10^{-1,160/(To+273.15)-2.003} \qquad ③$$

$$\Delta[\%C] = \eta \times Q_T \times (1-R) \times 11.2/12/(10 \times Wm) \qquad ④$$

$$\eta = Q_{O2}/((1-R) \times Q_T) \qquad ⑤$$

$$\eta = j \times \Delta T + k \qquad ⑥$$

$$\Delta T = (T + 273.15) - (-13,800/(-8.76 + \log([\%C]P_{CO}/[\%Cr]))) \qquad ⑦$$

$$P_{CO} = P \times 2 \times Q_T/(2 \times Q_T + Q_d) \qquad ⑧$$

$$\log[\%C] - \log[\%C]_O = m \times t \qquad ⑨$$

where,

T: measured molten steel temperature (° C.),

To: molten steel temperature before the commencement of decompression (° C.),

[%C]s: [C] concentration in molten steel before the commencement of decompression (mass %), ac: activity of [C] in molten steel before the commencement of decompression, fo: activity coefficient of [O] in molten steel before the commencement of decompression, $\eta$: ratio of oxygen gas consumed for decarburization to blown oxygen gas (–), $Q_T$: total amount of oxygen gas blown during temperature measurement span ($Nm^3$), R: secondary combustion ratio (–), Wm: molten steel amount (ton), $Q_{O2}$: amount of oxygen gas consumed for decarburization during temperature measurement span ($Nm^3$), $\Delta T$: difference between actual temperature and Hilty's equilibrium temperature (° C.),

[%C]: computed [C] concentration in molten steel (mass %),

[%Cr]: computed [Cr] concentration in molten steel (mass %),

P: degree of vacuum at the time of temperature measurement (atm.), $Q_d$: total amount of dilution gas blown during temperature measurement span ($Nm^3$),

[%C]$_0$: [C] concentration in molten steel at the commencement of diffusive decarburization term (mass %), t: time elapsed from the commencement of diffusive decarburization term (min.), and a, b, c, d, f, g, h, j, k and m: constant values determined by a refining furnace and refining conditions.

In addition, $P_{CO}$ can be controlled so that $\Delta T$ may be 50° C. or more. $P_{CO}$ may also be controlled by the control of an oxygen gas ratio to blown gas when a [C] concentration in molten steel is 0.15 mass % or more. In addition, $P_{CO}$ can be controlled by the control of an oxygen gas ratio to blown gas and/or the control of an atmospheric pressure when a [C] concentration in molten steel is 0.15 mass % or less.

The entire disclosures of all publications referred to herein are incorporated herein by reference.

DETAILED DESCRIPTION

Figure 1:
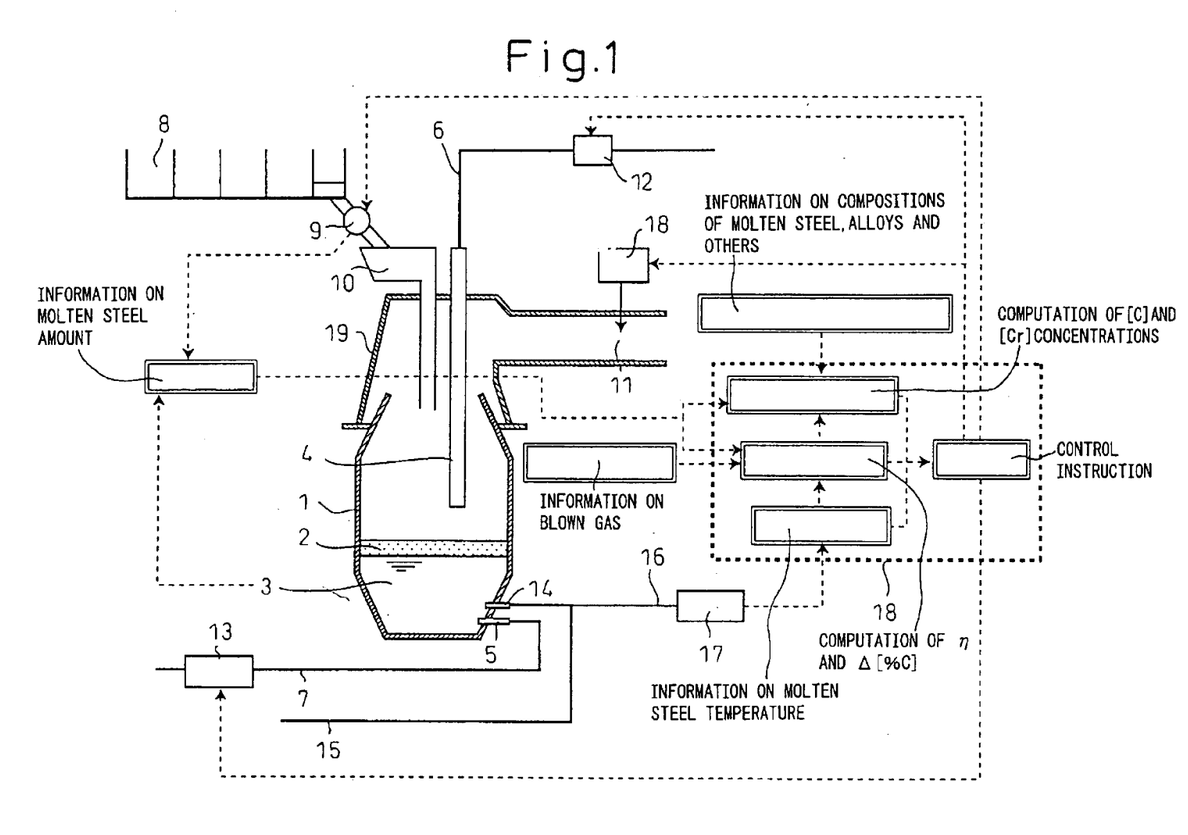
FIG. 1 is a schematic illustration showing an installation used for the implementation according to the present invention.

FIG. 1 schematically shows an exemplary installation used for the implementation according to the present invention with a vacuum AOD furnace taken as an example. It should be understood that a similar installation is applicable to an ordinary pressure AOD furnace. Molten steel 3 is charged in a vacuum AOD furnace 1 and slag 2 containing chromium oxide exists on the molten steel 3. Alloys, coolants and auxiliary materials are charged thereto through raw material hoppers 8, a feed gate 9, a charge shoot 10 and a vacuum furnace lid 19. Alloys include ferrochromium (Fe—Cr), ferronickel (Fe—Ni), ferrosilicon (Fe—Si), aluminum alloy, etc., coolants include scraps of various shapes and grades, auxiliary materials include CaO, $CaF_2$, MgO, $SiO_2$, etc., and those are selected variously in accordance with a steel grade to be refined.

A top-blow lance 4 is installed in the interior of the vacuum AOD furnace 1, a bottom-blow tuyere 5 is installed at the side wall, and oxygen and inert gas are ejected from the top-blow lance 4 and the bottom-blow tuyere 5. Decompression-refining in the vacuum AOD furnace 1 can be started by commencing blowing gas from the top-blow lance 4 and the bottom-blow tuyere 5, and simultaneously connecting the vacuum furnace lid 19 to a vacuum evacuation device 11 and commencing vacuum evacuation.

According to an exemplary embodiment of the present invention, a molten steel temperature during refining is determined by actual measurement or computation from a molten steel temperature before the refining and refining conditions. In the case of determining a molten steel temperature during refining by actual measurement, a tuyere for temperature measurement 14 is installed at the bottom of the vacuum AOD furnace 1 and an image fiber (not shown in the figure) for measuring a molten steel temperature by luminance is inserted in a purge gas supply pipe 15 connected to the tuyere for temperature measurement 14. Ar gas is used as the purge gas usually but a non-oxidizing gas such as nitrogen gas or CO gas may be used. Further, as a means for opening the tip of the tuyere for temperature measurement 14 when it is clogged, oxidizing gas such as oxygen, air and $CO_2$ gas may be supplied to the tuyere for temperature measurement 14.

The information obtained through the image fiber (not shown in the figure) in the purge gas supply pipe 15 is subjected to image processing and signal processing, converted from luminance to temperature in a temperature measurement and processing device 17, and then output as molten steel temperature information. In an arithmetic and control unit 18, the molten steel temperature is combined with the information on molten steel 3, slag 2 and materials supplied from the feed gate 9 before the commencement of decompression, the information on the blown gas ejected from a top-blow gas pipe 6 and a bottom-blow gas pipe 7 and the information from the vacuum evacuation device 11, and then a decarburization oxygen efficiency $\eta$ and a decarburized amount ($\Delta[\%C]$) are computed. Further, the information on a molten steel composition before the commencement of decompression and the compositions of charged alloys and scraps is input and [%C] and [Cr] concentrations are computed.

Further, in the arithmetic and control unit 18, operation conditions for suppressing the oxidation loss of [Cr] and the erosion of refractories are computed from the above information on the molten steel temperature and the [%C] and [Cr] concentrations, the computed operation directions are transferred to a top-blow gas control unit 12 installed in the top-blow gas pipe 6, a bottom-blow gas control unit 13 installed in the bottom-blow gas pipe 7, the vacuum evacuation device 11 and the feed gate 9, and by so doing the operation conditions are controlled.

According to one exemplary embodiment of the present invention, an equilibrium temperature $T_H$ may be determined through the Hilty's formula, the difference $\Delta T$ between the molten steel temperature during refining and said Hilty's equilibrium temperature $T_H$ is determined, and refining conditions are controlled so that said $\Delta T$ may be a prescribed value or more. For computing a Hilty's equilibrium temperature $T_H$, it is preferable to determine a molten steel temperature, a [C] concentration, a [Cr] concentration and $P_{CO}$ at a point of time during refining.

A molten steel temperature during refining may be determined through continuous actual measurement during the refining with the aforementioned temperature measurement and processing device or through computation from a molten steel temperature before the refining and refining conditions. For such computation, on the basis of past refining data, a heat input is computed from the actual data of a supplied oxygen amount, a temperature drop is computed from the actual data of a charged coolant amount, and then a present molten steel temperature is computed on the basis of the temperature measurement results before the refining. When an actually measured temperature during refining as a molten steel temperature is used instead of a computed temperature, the fluctuation of a coolant charging rate and a dissolving rate at the time of coolant charge, the fluctuation of an oxygen supply rate with the passage of time and the like are taken into consideration, therefore the determined temperature is more accurate than a computed temperature and, as a result, a highly accurate refining control is preferably realized.

[C] and [Cr] concentrations during refining can be determined by sampling molten steel at intervals during the refining and analyzing the components in the molten steel. Otherwise, according to the present invention, [C] and [Cr] concentrations during refining can be determined through computation from molten steel components before the refining, a supplied oxygen amount as the total oxygen amount of oxygen gas and solid oxygen source, the transition of oxygen gas ratio to blown gas and the past refining data. The reason is that it is known that the employment of the same refining conditions causes nearly the same refining progress and thus molten steel components can be estimated with high accuracy from the past actual data under the same refining conditions. Further, [C] and [Cr] concentrations during refining can be determined through computation with the analysis result of exhaust gas taken into consideration. The information on a decarburized amount wherein the influence of the composition and amount of slag existing on molten steel, the influence of small fluctuation of a secondary combustion rate with the passage of time and the like are taken into consideration can be obtained by continuously analyzing the exhaust gas components during refining and therefore the accuracy of estimating molten steel components during the refining can be improved more than in the case of computing a decarburized amount with only the composition and amount of molten steel taken into consideration.

[C] and [Cr] concentrations during refining can also be determined by sequential computation with the lapse of time from the commencement of the refining via a decarburization oxygen efficiency η and, by so doing, the accuracy of estimating molten steel components can be improved further.

A decarburization oxygen efficiency η is the ratio of oxygen consumed for decarburization to oxygen blown into molten steel. A part of the whole oxygen blown into a furnace is firstly consumed in secondary combustion. Thereafter, the oxygen blown into the molten steel is used for decarburization and [Cr] oxidation. Therefore, a decarburization oxygen efficiency η, that is the ratio of oxygen consumed for decarburization to oxygen blown into molten steel, is defined by the following formula (6):

$$\eta = q_c / ((1-R) \cdot q_T) \quad (6),$$

where $q_c$ is the amount of oxygen gas per unit time consumed for decarburization (Nm³/min.), $q_T$ the total amount of blown oxygen gas per unit time (Nm³/min.), and R a secondary combustion rate (–).

A secondary combustion rate R is the value that is determined by the supply condition of oxygen from a top-blow lance, shows a nearly constant value as long as the supply condition is constant and, thus, is regarded as a constant and is generally in the range from 0.05 to 0.20.

When a decarburization oxygen efficiency η can be determined at an arbitrary timing during refining, as a blown oxygen amount per unit time and a secondary combustion rate R are already known, the amount of oxygen consumed for decarburization is determined through the aforementioned formula (6) and the decarburized amount Δ[C] per unit time may also be determined. When a [C] concentration at the time is determined, a [C] concentration after the lapse of short time can be determined by using above-determined Δ[C]. In this manner, [C] concentrations with the lapse of time during refining can be determined by sequential computation.

Figure 4:
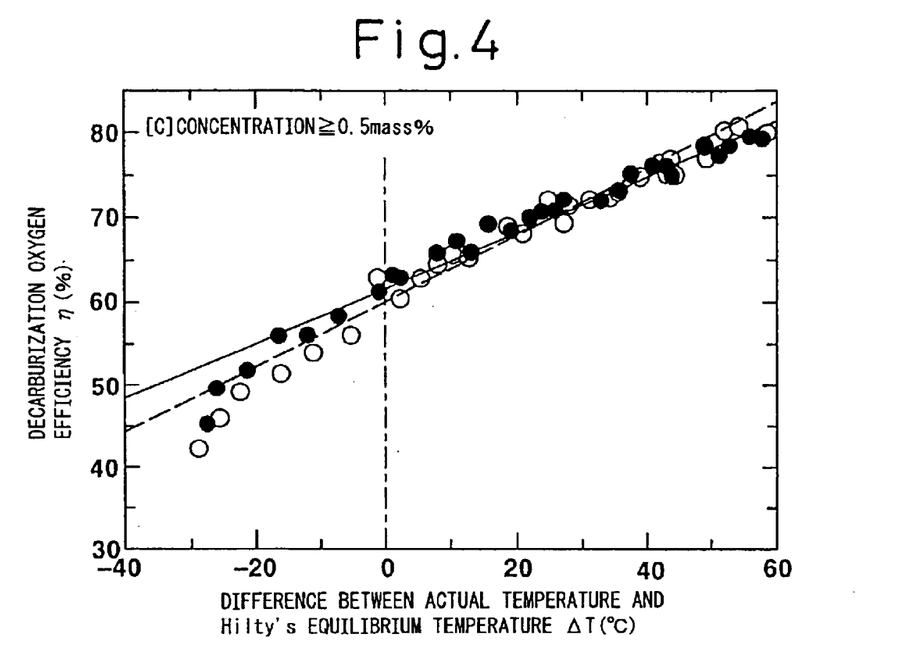
FIG. 4 is a graph showing the relationship between $\Delta T$ and decarburization oxygen efficiencies when a [C] concentration in molten steel at AOD refining under a normal pressure is 0.5 mass % or more.
Figure 5:
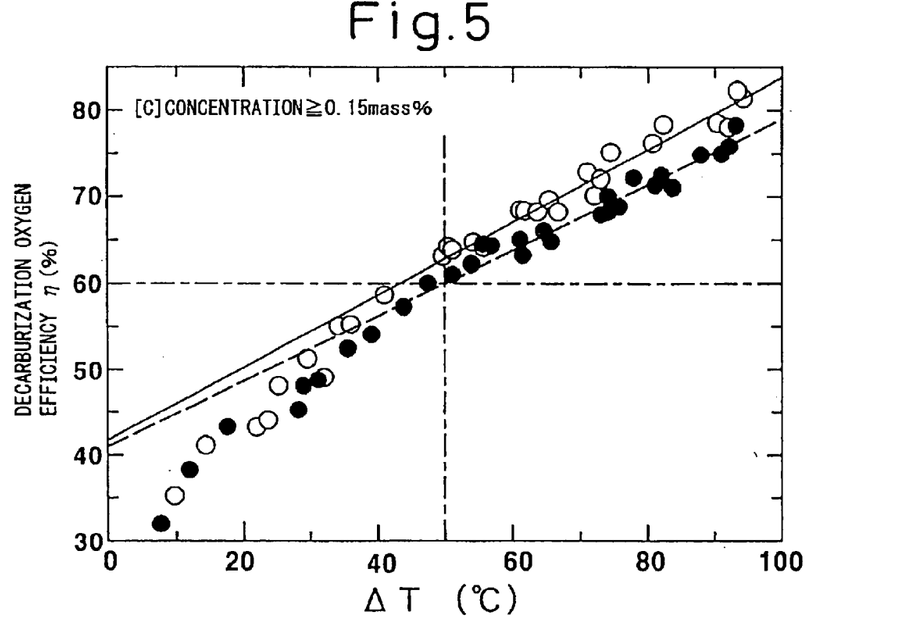
FIG. 5 is a graph showing the relationship between $\Delta T$ and decarburization oxygen efficiencies at an oxygen decarburization term when a [C] concentration in molten steel at AOD refining under a reduced pressure is 0.15 mass % or more.
Figure 6:
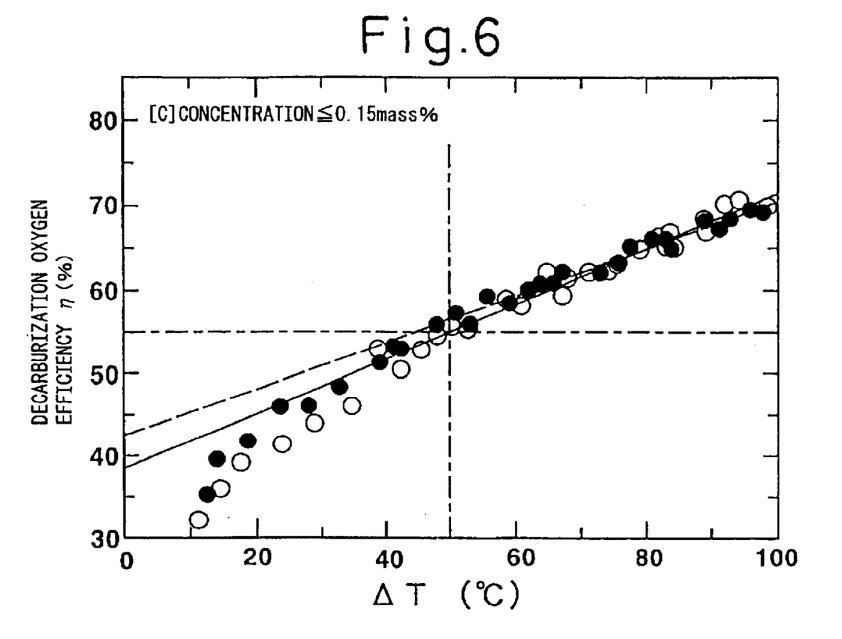
FIG. 6 is a graph showing the relationship between $\Delta T$ and decarburization oxygen efficiencies in an oxygen decarburization term when a [C] concentration in molten steel at AOD refining under a reduced pressure is 0.15 mass % or less.

When a molten steel temperature, a [C] concentration and a [Cr] concentration are determined at an arbitrary timing during refining as the result of actual measurement or sequential computation, by adding the actual $P_{CO}$ data to those, a Hilty's equilibrium temperature is determined from the Hilty's formula and then the difference ΔT between the molten steel temperature T and the Hilty's equilibrium temperature can be determined. The relationship between above-determined ΔT and aforementioned decarburization oxygen efficiency η was examined and the results shown in FIG. 4 were obtained in the case of ordinary pressure AOD and the results shown in FIGS. 5 and 6 were obtained in the case of decompression AOD. FIGS. 4 to 6 show the relationship between ΔT and η after oxygen blowing is commenced at an oxygen gas to blown gas ratio of 20% or more when SUS 304 stainless steel (18 mass % Cr–8 mass % Ni) is decarburization-refined in an AOD furnace by a conventional method while the temperature measurement and sampling of the molten steel are carried out at the intervals of 2 to 5 min. Here, the marks ○ in the figures represent the data in the case of an AOD furnace 60 tons in capacity and the marks ● the data in the case of an AOD furnace 90 tons in capacity. A Hilty's equilibrium temperature $T_H$ is computed from the sampled molten steel compositions and gas blowing conditions through the formulae (3) and (5), and ΔT is computed as the difference between an actually measured molten steel temperature and an obtained Hilty's equilibrium temperature $T_H$. The [C] concentrations are all 0.5 mass % or more in FIG. 4, all 0.15 mass % or more in FIG. 5, and all 0.15 mass % or less in FIG. 6. A correlation is provided between ΔT and η, as is shown in the figures and, therefore, if ΔT is determined at an arbitrary timing during refining, η can be determined from the ΔT.

As described above, a decarburized amount Δ[C] per unit time can be determined by determining ΔT from a [C] concentration, a [Cr] concentration, an actual $P_{CO}$ and an actual molten steel temperature at the time of the commencement of refining as the starting point and then determining η from the ΔT. A [C] concentration after the lapse of a short time (Δt) can be determined from the above-determined Δ[C] and, therefore, by such a sequential computation, the change of [C] concentrations with the lapse of time during refining can be determined very accurately. A short time interval Δt used in the sequential computation may be an arbitrary time interval as long as a good computation accuracy is maintained. When an actually measured temperature is used as a molten steel temperature, it is convenient if the interval between adjacent temperature measurements (a temperature measurement span) is employed as Δt.

A [Cr] concentration and a molten steel temperature at the time of relevant computation can also be used in the computation of ΔT. It is possible to determine a [Cr] concentration by the above-described computation according to the present invention. It is further possible to determine a [Cr] concentration, with high accuracy, by a sequential computation wherein 72 is used. Specifically, when the amount of oxygen gas per unit time consumed for the oxidation of Cr is defined as $q_{Cr}$, the total amount of oxygen consumed for both decarburization and Cr oxidation ($q_C + q_{Cr}$) is ((1−R)

·$q_T$) and therefore $q_{Cr}$ is defined by the following formula (7) from the formula (6):

$$q_{Cr}=(1-\eta)\cdot q_T\cdot(1-R) \quad (7).$$

Accordingly, a burnt [Cr] amount per unit time Δ[Cr] can be computed in approximately the same way as the aforementioned Δ[C] and, as a result, it is possible to determine a [Cr] concentration during refining accurately by sequential computation. A molten steel temperature during refining can be determined by actual measurement or computation from a molten steel temperature before the refining and refining conditions, and a most accurate molten steel temperature can be obtained by continuous actual measurement.

A secondary combustion ratio R is the value that is determined by the supply condition of oxygen from a top-blow lance, shows a nearly constant value as long as the supply condition is constant and, thus, it is regarded as a constant and is generally in the range from 0 to 0.20. Needless to say, an actual secondary combustion ratio R obtained by analyzing components in AOD furnace exhaust gas may also be used.

In the above computation, Δ[C] and Δ[Cr] can concretely be computed by the following formulae according to the present invention:

$$\Delta[C]=\eta\times q_T\times(1-R)\times12/11.2/(10\times Wm) \quad (8),$$

$$\Delta[Cr]=(1-\eta)\times q_T\times(1-R)\times104/33.6/(10\times Wm) \quad (9),$$

where, Δ[C] and Δ[Cr] are the variations of [C] and [Cr] per unit time (mass %/min.), $q_T$ is an oxygen gas supply rate per unit time (Nm$^3$/min.), R a secondary combustion rate (-), and Wm a molten steel amount (ton).

In the case of ordinary pressure AOD refining, it is possible to determine ΔT, at an arbitrary timing during the refining, by repeating the aforementioned sequential computation from the commencement to the end of the refining. In contrast, in the case where ordinary pressure AOD refining is applied at the start of the refining and then vacuum AOD refining is applied during the course of the refining with a vacuum furnace lid mounted on the furnace body, as indicated in the aforementioned item (5) of the present invention, sequential computation with high accuracy can be implemented by: dividing the process of decarburization-refining under a reduced pressure into three terms composed of a term from the commencement of decompression to the commencement of oxygen gas blow (a natural decarburization term), a term during which an oxygen gas ratio to blown gas is 20% or more after the natural decarburization term (an oxygen decarburization term), and a term during which an oxygen gas ratio to blown gas is less than 20% after the natural decarburization term (a diffusive decarburization term); and defining computation logic for each term.

As the result of the analysis of actual refining data, in a natural decarburization term that is the term from the commencement of decompression to the commencement of oxygen gas blow, a decarburized amount can be proportional to an [O] concentration before the commencement of the decompression and further the [O] concentration before the commencement of the decompression is obtained as the function of a molten steel temperature and a molten steel composition before the commencement of the decompression. Firstly, an [O] concentration before the commencement of decompression ([O]cal) can be determined from a [C] concentration in molten steel before the commencement of the decompression ([C]s), a [C] activity (ac) in the molten steel and a measured molten steel temperature before the commencement of the decompression (To). Specifically, an equilibrium [O] concentration ([O]e) at the reaction of [C]+[O]=CO (g) is determined from ac and T by using a formula for computation in consideration of the activity of molten steel components. Usually, [O]e is computed by the following formula:

$$[O]e=1/(ac\times fo)\times 10^{-1,160/(T_o+273.15)-2.003} \quad (10).$$

In addition, when a parameter Z is defined by the following formula as a value obtained in consideration of the deviation of $P_{CO}$, an [O] concentration ([O]) before the commencement of decompression has a high correlation with the parameter Z:

$$Z=[O]e\times 10^{fo/T_o+g\times log[\%C]s+h} \quad (11),$$

where, To is a molten steel temperature (° C.) before the commencement of decompression, [%C] is a [C] concentration (mass %) in molten steel before the commencement of decompression, ac an activity of [C] in molten steel before the commencement of decompression, fo an activity coefficient of [O] in molten steel before the commencement of decompression, and g and h are constants determined by a refining furnace and refining conditions.

Therefore, by obtaining the relationship between Z and an [O] concentration before the commencement of decompression from the past refining data beforehand, it is possible to determine an [O] concentration before the commencement of decompression by computation from the above-determined [O]e, a molten steel temperature and [C]s, and to regard the determined [O] concentration as [O]cal. Further, it is already known that there is a high correlation between [O]cal and a decarburized amount. Therefore, by obtaining the relationship between an [O]cal and a decarburized amount from the past refining data beforehand, it is possible to determine a decarburized amount at a natural decarburization term from the [O]cal obtained through above computation.

Figure 2:
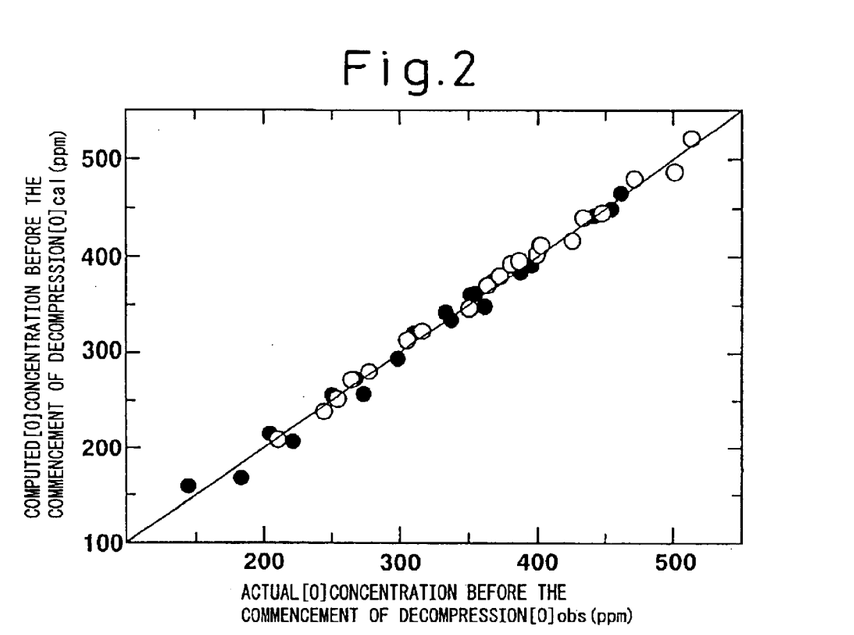
FIG. 2 is a graph showing the relationship between actual [O] concentrations and computed [O] concentrations before the commencement of decompression-refining.

FIG. 2 shows the relationship between actual [O] concentrations ([O]obs) and computed [O] concentrations ([O]cal) determined by the above procedure before the commencement of decompression-refining when SUS 304 stainless steel (18 mass % Cr–8 mass % Ni) is decompression-refined in a vacuum AOD furnace. In the figure, the marks ○ represent the data in the case of a vacuum AOD furnace 60 tons in capacity and the marks ● the data in the case of a vacuum AOD furnace 90 tons in capacity. Here, the values, c=18, d=0.97, f=−5,700, g=0.83 and h=3.35 in the case of the 60-ton AOD furnace and c=21, d=0.98, f=−5,600, g=0.85 and h=3.30 in the case of the 90-ton AOD furnace, are obtained by the trial-and-error method and used for the computation. From FIG. 2, the marks ○ and ● are almost on the same line. Therefore, it is understood that, by obtaining the relationship between Z and an [O] concentration before the commencement of decompression from the past refining data in the right way beforehand, it is possible to compute accurately an [O] concentration before the commencement of decompression in the refining as [O]cal.

Figure 3:
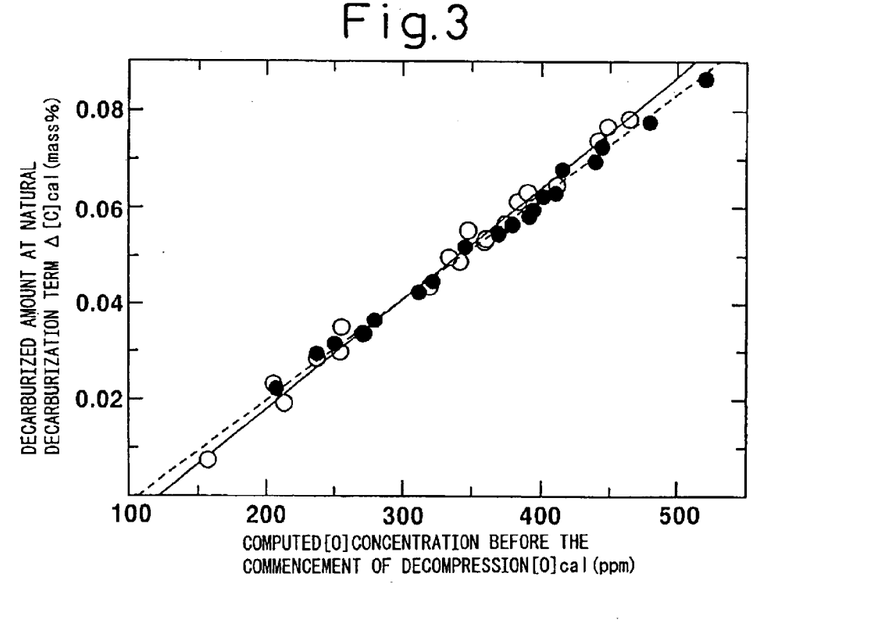
FIG. 3 is a graph showing the relationship between computed [O] concentrations before the commencement of decompression-refining and decarburized amounts in a natural decarburization term.

FIG. 3 shows the relationship between [O]cal determined by the above described procedure and decarburized amounts at a natural decarburization term at the commencement of decompression when SUS 304 stainless steel (18 mass % Cr–8 mass % Ni) is decompression-refined in a vacuum AOD furnace. In the figure, the marks ○ represent the data in the case of a vacuum AOD furnace 60 tons in capacity and the marks ● the data in the case of a vacuum AOD furnace 90 tons in capacity. FIG. 3 makes it clear that, though the marks ○ and ● deviate from each other to some extent, there is a good linear relation between [O]cal and decarburized amounts in a natural decarburization term.

Based on the above description, it is understood that a decarburized amount in a natural decarburization term is determined easily. A [C] concentration after natural decarburization, namely at the commencement of an oxygen decarburization term, is computed by determining a [C] concentration before the commencement of decompression-refining through molten steel analysis and then subtracting the decarburized amount computed as above from the determined [C] concentration.

With regard to the change of [Cr] concentration at a natural decarburization term, an increased amount of [Cr] in molten steel is determined from a decarburized amount at a natural decarburization term since the decarburization reaction is presumably represented by $(Cr_2O_3+3[C]=2[Cr]+3CO)$, and then the amount of change of the [Cr] concentration can be determined by dividing the determined increased [Cr] amount by the molten steel amount.

Next, in an oxygen decarburization term, where the ratio of oxygen gas to blown gas is 20% or more, after a natural decarburization term, [C] and [Cr] concentrations during refining, according to the present invention, can be determined by sequential computation with the lapse of time from the commencement of the oxygen decarburization term via a decarburization oxygen efficiency $\eta$. [C] and [Cr] concentrations at an arbitrary timing during refining can be determined with high accuracy through the computation processes of; setting the above-determined [C] and [Cr] concentrations at the commencement of the oxygen decarburization term as the initial concentrations; determining a decarburization oxygen efficiency $\eta$ as the function of $\Delta T$ determined by using the Hilty's formula; determining a decarburization rate and a [Cr] oxidation rate from the decarburization oxygen efficiency $\eta$ and an oxygen gas supply rate; computatively determining [C] and [Cr] concentrations after the lapse of a prescribed short time ($\Delta t$); and repeating the calculation.

In the above-described computation, an in particular, $\Delta[C]$ and $\Delta[Cr]$ can be computed through the following formulae according to the present invention:

$$\Delta[C]=\eta \times q_T \times (1-R) \times 12/11.2/(10 \times Wm) \quad (8),$$

$$\Delta[Cr]=(1-\eta) \times q_T \times (1-R) \times 104/33.6/(10 \times Wm) \quad (9),$$

where, $\Delta[C]$ and $\Delta[Cr]$ are the variations of [C] and [Cr] per unit time (mass %/min.), $q_T$ is an oxygen gas supply rate per unit time ($Nm^3$/min.), R a secondary combustion ratio (–), and Wm a molten steel amount (ton).

Next, the method for computing the transition of a [C] concentration at a diffusive decarburization term, where the ratio of oxygen gas to blown gas is less than 20%, after a natural decarburization term is explained herein. In the decompression-refining of chromium-contained molten steel, an oxygen gas ratio to blown gas of less than 20% is generally applied at the time when [C] is 0.1 mass % or less. That is, as stated above, the [C] range of 0.1 mass % or less is the one where [C] is governed by diffusion in molten steel.

Figure 7:
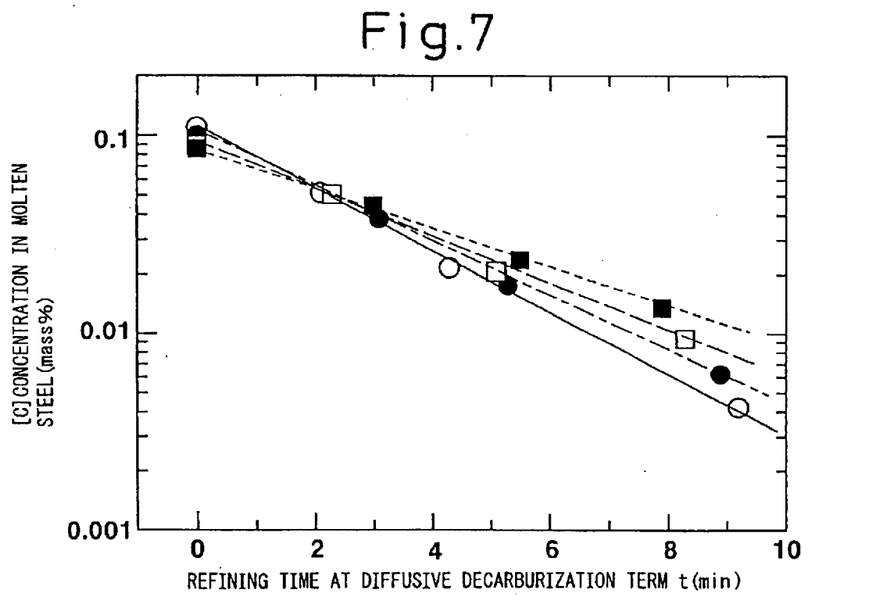
FIG. 7 is a graph showing the relationship between refining time periods and [C] concentrations in molten steel in a diffusive decarburization term.

FIG. 7 shows the transition of the logarithmic value of [C] with the passage of time at an oxygen gas ratio to blown gas of less than 20% when SUS 304 stainless steel (18 mass % Cr–8 mass % Ni) is decarburization-refined under a reduced pressure in a vacuum AOD furnace by a conventional method while the temperature measurement and sampling of the molten steel are carried out at the intervals of 2 to 5 min.

Here, the marks ○ and □ in the figure represent the data in the case of an AOD furnace 60 tons in capacity, the marks ● and ■ the data in the case of an AOD furnace 90 tons in capacity, the marks ○ and ● the data in the case of about 0.1 atm. in the degree of vacuum, and the marks □ and ■ the data in the case of about 0.2 atm. in the degree of vacuum.

From FIG. 7, it has been clarified that, though there are some differences in the gradient of the lines among those conditions, a good linear relation can be obtained between the time t from the commencement of a diffusive decarburization term and log[C]. From the fact, it is possible in a diffusive decarburization term to determine the change of the logarithmic value (log[C]) of a carbon concentration [C] from the commencement of the diffusive decarburization term as a function proportionate to the time t from the commencement of the diffusive decarburization term, and to compute [C] from the determined value immediately. Further, a [Cr] concentration can be determined as a function of an oxygen supply rate and a decarburization rate. The reason is that, oxygen required for decarburization derives from supplied oxygen, and when an oxygen supply rate is larger than a decarburization rate, the balance of the oxygen is used for the oxidation of [Cr] in molten steel and, therefore, a [Cr] concentration changes in relation to the oxygen supply rate and the decarburization rate.

According to yet another exemplary embodiment of the present invention, a CO partial pressure $P_{CO}$ in an atmosphere during refining can be determined from a total pressure P, an oxygen gas supply rate $q_T$ and an inert gas supply rate $q_d$ using the following formula:

$$P_{CO}=P \times 2 \times q_T/(2 \times q_T+q_d) \quad (3).$$

A value computed using the following formula can be used as a Hilty's equilibrium temperature $T_H$ as indicated in the aforementioned item (8) of the present invention:

$$T_H=\{-13,800/(-8.76+\log([C]P_{CO}/[Cr]))\} \quad (5),$$

where the units of the parameters are; K for $T_H$, mass % for [C] and [Cr], and atm. for $P_{CO}$.

The constants in the Hilty's formula are not limited to the values stipulated in the formula (5) and any values can be employed as long as the formula substantially represents a Hilty's equilibrium temperature.

By determining the difference $\Delta T$ between a molten steel temperature during refining and a Hilty's equilibrium temperature $T_H$ and thereafter controlling refining conditions so that $\Delta T$ may take a prescribed value or higher, it is possible to suppress the oxidation loss of [Cr] and reduce the damage of refractories while the amount of consumed inert gas is suppressed to the minimum. It has so far been known qualitatively that, to promote decarburization of chromium-contained molten steel efficiently, it is enough if decarburization is implemented while refining conditions are controlled in a decarburization dominant range determined by the Hilty's formula. However, as the influence of refining conditions on $\eta$ has not quantitatively been clarified yet, an excessive refining operation has been performed and that has caused the increase of a refining cost and the deterioration of productivity. $\Delta T$ and $\eta$ can be expressed by the aforementioned quantitative relation. It was also ascertained $\Delta T$ conditions for maintaining $\eta$ at a high level by the trial-and-error method using the aforementioned relation and a refining control means effective for controlling $\Delta T$ in each [C] concentration range.

In particular, it may be preferable to control refining conditions so that $\Delta T$ may be 0° C. or more when a [C]

concentration in molten steel is 0.5 mass % or more, 30° C. or more when the same is 0.2 mass % or more, and 50° C. or more when the same is lower than 0.2 mass %.

A value of ΔT for promoting decarburization with a high efficiency increases as a [C] concentration decreases. The reason is that [Cr] tends to be oxidized more easily as a [C] concentration decreases in chromium-contained molten steel and, as a result, the oxidation of [Cr] must be suppressed by increasing the value of ΔT as an index of the deviation from equilibrium. The present inventors determined a threshold value on the basis of the above concept and proposed the aforementioned value.

As methods for controlling ΔT, the method of controlling ΔT either by controlling the composition of an atmospheric gas or by controlling a molten steel temperature can be adopted.

It may also be preferable to control aforementioned ΔT by the control of a molten steel temperature when a [C] concentration in molten steel is 0.5 mass % or more. When a [C] concentration in molten steel is 0.5 mass % or more, usually, decarburization is promoted under the conditions of a high oxygen supply rate and a high oxygen ratio to blown gas. To control an atmospheric gas for controlling ΔT under such conditions leads to the decrease of an oxygen supply rate and causes a decarburization rate to decrease. For that reason, the control of a molten steel temperature is a means effective for the control of ΔT.

Further, when a [C] concentration in molten steel is in the range from 0.2 to 0.5 mass %, as indicated in the aforementioned item (11) of the present invention, it is preferable to control the aforementioned ΔT by the control of the pressure in a refining vessel. When a [C] concentration in molten steel is in the range from 0.2 to 0.5 mass %, usually, a molten steel temperature is relatively in a stable state, an oxygen supply rate decreases in comparison to the case of a high [C] concentration, and resultantly conditions under which vacuum refining is applicable are secured. A means effective for maintaining a high oxygen supply rate and a high decarburization oxygen efficiency under such conditions is to control the pressure in a refining vessel and, thus, ΔT is controlled.

Furthermore, when a [C] concentration in molten steel is less than 0.2 mass %, as indicated in the aforementioned item (12) of the present invention, it is preferable to control aforementioned ΔT by the control of the pressure in a refining vessel and an oxygen gas ratio to blown gas. When a [C] concentration in molten steel is less than 0.2 mass %, usually, a molten steel temperature is relatively in a stable state, an oxygen supply rate decreases, and resultantly vacuum refining is applicable. Under such conditions, the control of $P_{CO}$ is important for the control of ΔT and a means effective for that control is to control the pressure in a refining vessel and an oxygen gas to blown gas ratio.

Another exemplary embodiment of the present invention is described in greater detail herein below.

When chromium-contained molten steel is decarburization-refined under a reduced pressure while blown gas composed of oxygen and inert gas is injected in an installation that is equipped with a tuyere 14 for temperature measurement at the bottom of a vacuum AOD furnace 1, a temperature measurement and processing device 17 that allows to output molten steel temperature information and an arithmetic and control unit 18 for the computation of refining conditions, a means for measuring molten steel temperatures continuously is secured and Δ[%C] and [%C] and [Cr] concentrations can be estimated continuously. Accordingly, it becomes possible to control an oxygen gas to blown gas ratio and/or an atmospheric pressure for the control of $P_{CO}$ in accordance with above-obtained information.

Such control makes it possible: to solve the problems of the erosion of refractories caused by a temperature higher than molten steel temperature usually required for securing metallurgical properties, the decrease of an oxygen gas to blown gas ratio further than necessary, and the deterioration of productivity caused by the extension of processing time due to the late addition of alloys, coolants and auxiliary materials; and to carry out the decompression-refining of chromium-contained molten steel efficiently.

In decarburization-refining of chromium-contained molten steel under a reduced pressure, usually, operation parameters widely vary; [%C] at the time of the commencement of decarburization-refining under a reduced pressure is in the range from 0.1 to 0.6 mass %, a molten steel temperature in the range from 1,600° C. to 1,750° C., and the degree of vacuum during decompression-refining in the range from 0.03 to 0.5 atm. Therefore, a decarburization oxygen efficiency η varies in accordance with a molten steel temperature, [%C], the degree of vacuum and an oxygen gas ratio to blown gas and that causes the oxidation loss of [Cr] to vary. For that reason, to determine η and Δ[%C] from a molten steel temperature measured continuously and to control $P_{CO}$ by those values can be adopted as a means effective for the suppression of the oxidation loss of [Cr] and the erosion of refractories.

In this connection, initially, methods for computing η, Δ[%C] and [%C] are explained hereunder.

Though quantitative knowledge has not been sufficient up to now, it is known that, in decompression-refining of chromium-contained molten steel, a decarburization period is divided into three terms; a natural decarburization term, an oxygen decarburization term and a diffusive decarburization term. A method for determining Δ[%C] and [%C] in the three terms as a result of various experiments and analyses has been obtained according to the present invention.

Firstly, in a natural decarburization term from the commencement of decompression to the commencement of oxygen blowing, Δ[%C] can be proportional to an [O] concentration before the commencement of the decompression and the [O] concentration before the commencement of the decompression could be determined as a function of the temperature and composition of molten steel before the commencement of the decompression. An [O] concentration before the commencement of the decompression ([O]cal) can be determined from a [C] concentration in molten steel before the commencement of the decompression ([%C]s), an activity of [C] in the molten steel (ac) and a measured molten steel temperature before the commencement of the decompression (To). That is, an equilibrium [O] concentration ([O]e) at the reaction [C]+[O]=CO (g) may be determined from ac and To. Next, the [O] concentration before the commencement of the decompression is determined as a function of the thus determined [O]e, the molten steel temperature and [%C]s. From [O]cal thus determined, a decarburized amount (Δ[%C]) can be determined as a function of [O]cal. Here, as a function of [O]cal, a linear function of [O]cal is most desirable but a function of higher degree or of another kind may be used. Whichever function may be used, a function close to a linear function is obtained substantially.

The above relation can be expressed by the following formulae ① to ③:

$$\Delta[\%C] = a \times [O]cal + b \qquad ①,$$

$$[O]cal = c + d \times [O]e \times 10^{fo/To + g \times \log[\% C]s + h} \qquad ②,$$

$$[O]e = 1/(ac \times fo) \times 10^{-1,160/(To+273.15)-2.003} \qquad ③,$$

where To is a molten steel temperature before the commencement of decompression (° C.), [%C]s a [C] concentration in molten steel before the commencement of decompression (mass %), ac an activity of [C] in molten steel before the commencement of decompression, fo an activity coefficient of [O] in molten steel before the commencement of decompression, and a, b, c, d, f, g and h constant values determined by a refining furnace and refining conditions and determined easily from the past refining data.

The formula ③ can be used to determines an equilibrium [O] concentration ([O]e) at the reaction [C]+[O]=CO (g) and the value is determined easily if the temperature and composition of molten steel are known. The formula ② indicates that an [O] concentration before the commencement of decompression is determined as a function of [O]e, a molten steel temperature and [%C]s. Usually, an [O] concentration does not have to be analyzed during refining because it takes a long time. However, when the analysis value of an [O] concentration is known, it is possible to use the analysis value for the computed [O] concentration ([O]cal) in the formula ①. By using a formula obtained by substituting the formula ③ for the formula ②, it is possible to determine [O]cal without computing [O]e during the course of the computation. Likewise, by using a formula obtained by substituting [O]cal in the formula ② for [O]cal in the formula ①, it is possible to determine Δ[%C] without computing [O]cal during the course of the computation.

FIG. 2 shows the relationship between actual [O] concentrations ([Q]obs) before the commencement of decompression-refining and computed [O] concentrations ([O]cal) determined by the above formulae ② and ③ when SUS 304 stainless steel (18 mass % Cr–8 mass % Ni) is decompression-refined in a vacuum AOD furnace. In the figure, the marks ○ represent the data in the case of a vacuum AOD furnace 60 tons in capacity and the marks ● the data in the case of a vacuum AOD furnace 90 tons in capacity. Here, the values, c=18, d=0.97, f=–5,700, g=0.83 and h=3.35 in the case of the 60-ton AOD furnace and c=21, d=0.98, f=–5,600, g=0.85 and h=3.30 in the case of the 90-ton AOD furnace, are obtained by the trial-and-error method and used for the computation. From FIG. 2, the marks ○ and ● are almost on the same line.

FIG. 3 shows an exemplary relationship between [O]cal determined by the above formulae ② and ③ and decarburized amounts (Δ[%C]) in a natural decarburization term at the commencement of decompression when SUS 304 stainless steel (18 mass % Cr–8 mass % Ni) is decompression-refined in a vacuum AOD furnace. In FIG. 3, the marks ○ represent the data in the case of a vacuum AOD furnace 60 tons in capacity and the marks ■ the data in the case of a vacuum AOD furnace 90 tons in capacity. From FIG. 3, though the marks ○ and ■ deviate from each other to some extent, there is a good linear relation between [O]cal and Δ[%C].

From above explanations, it has been confirmed that Δ[%C] is determined easily by the above formulae ① to ③.

Next, a method for computing a decarburization oxygen efficiency η and a decarburized amount (Δ[%C]) at an oxygen decarburization term, where an oxygen gas ratio to blown gas is 20% or more, after a natural decarburization term is explained.

In particular, η is indicative of the ratio of the amount of oxygen gas consumed for decarburization ($Q_{O2}$) to the amount of total oxygen gas ($Q_T$) blown during a temperature measurement span while the part of oxygen consumed for secondary combustion is excluded and is generally defined by the following formula ⑤. Further, a decarburized amount (Δ[%C]) can be determined stoichiometrically from the above $Q_{O2}$ and a molten steel amount (Wm). Therefore, if η is determined, then Δ[%C] is determined. To be more precise, Δ[%C] can be determined through the following formula ④:

$$\Delta[\%C]=\eta \times Q_T \times (1-R) \times 11.2/12/(10 \times Wm) \qquad (4),$$

$$\eta = Q_{O2}/((1-R) \times Q_T) \qquad (5),$$

where, $Q_T$ is a total amount of oxygen gas blown during a temperature measurement span (Nm³), R a secondary combustion ratio (–), Wm a molten steel amount (ton), $Q_{O2}$ an amount of oxygen gas consumed for decarburization during a temperature measurement span (Nm³), and Δ[%C] a decarburized amount (mass %) during a temperature measurement span. Here, a temperature measurement span means a time span required for subjecting the information obtained by continuous temperature measurement to image processing and displaying the result, and is 1 to 5 sec. usually.

A secondary combustion ratio R is the value that is determined by the supply condition of oxygen from a top-blow lance, which shows a nearly constant value as long as the supply condition is constant and, thus, is regarded as a constant, and is generally in the range from 0 to 0.20. Needless to say, an actually measured secondary combustion rate R obtained by analyzing the components in AOD furnace exhaust gas may also be used.

After the commencement of decompression-refining, if η is determined sequentially from the commencement of oxygen blowing after a natural decarburization term, as a blown oxygen amount $Q_T$, a secondary combustion rate R and a molten steel amount Wm are already known, the amount of oxygen gas consumed for decarburization $Q_{O2}$ is determined and then Δ[%C] is determined. If a molten steel composition before the commencement of decompression-refining and the amounts and compositions of alloys, scraps, etc. that are added during the refining are known, the amount of oxygen gas consumed for decarburization ($Q_{O2}$) during a temperature measurement span is determined from the aforementioned η, $Q_T$ and secondary combustion rate (R) and then a decarburized amount (Δ[%C]) is determined easily from the $Q_{O2}$ and a molten steel amount (Wm). Further, it can be assumed that the oxygen other than that consumed for decarburization and secondary combustion is all used for the oxidation of [Cr] in molten steel, a [Cr] concentration in the molten steel can be determined on the basis of the assumption.

Next, a method for computing η on the basis of the measurement of a molten steel temperature is explained hereunder.

The difference between a measured current molten steel temperature T and a Hilty's equilibrium temperature is defined as ΔT. A Hilty's equilibrium temperature is the temperature that is expressed by the formula Th (° C.)=–13,800/(–8.76+log([%C]$P_{CO}$/[%Cr])). Consequently, the following formula ⑦ is introduced. Here, as [%C] and [%Cr] are obtained sequentially at short intervals in the method according to the present invention, it is possible to use the latest computed [C] concentration in molten steel as [%C] and the latest computed [Cr] concentration in molten steel as [%Cr]. A [C] concentration at the time of temperature measurement that is estimated from the latest computed [C] concentration and Δ[%C] may also be used. A [Cr] concentration is the same. Further, a CO partial pressure $P_{CO}$ in an atmosphere at the time of temperature measurement can be determined from the degree of vacuum (P) at the time of temperature measurement, the total amount of oxygen gas blown during a temperature measurement span ($Q_T$) and the total amount of dilution gas blown during a temperature measurement span ($Q_d$). In particular, $P_{CO}$ may be defined by the following formula ⑧. The formula ⑧ is the one that determines $P_{CO}$ on the assumption that all blown oxygen gas is consumed for decarburization. An actual $P_{CO}$ value is smaller than that determined by the formula ⑧. However, $P_{CO}$ can be difficult to measure and, therefore, by estimating the maximum $P_{CO}$ value by the formula ⑧, the reaction state can be evaluated.

FIG. 5 shows the relationship between $\Delta T$ and $\eta$ after oxygen blowing is commenced at an oxygen gas to blown gas ratio of 20% or more when SUS 304 stainless steel (18 mass % Cr–8 mass % Ni) is decarburization-refined under a reduced pressure in a vacuum AOD furnace by a conventional method while the temperature measurement and sampling of the molten steel are carried out at the intervals of 2 to 5 min. According to FIG. 5, all data shown in therein are provided when all [C] concentrations are 0.15 mass % or more, and the marks ○ in the figure represent the data in the case of an AOD furnace 60 tons in capacity and the marks ● the data in the case of an AOD furnace 90 tons in capacity. $\Delta T$ is a value obtained from the degree of vacuum at the time of temperature measurement and sampling, gas blowing conditions and the temperature and composition of molten steel through the following formulae ⑦ and ⑧:

$$\Delta T=(T+273.15)-(-13,800/(-8.76+\log([\%C]P_{CO}/[\%Cr]))) \quad ⑦,$$

$$P_{CO}+P\times 2\times Q_T/(2\times Q_T+Q_d) \quad ⑧,$$

where T is a measured molten steel temperature (° C.), [%C] a [C] concentration in molten steel (mass %), [%Cr] a [Cr] concentration in molten steel (mass %), P the degree of vacuum at the time of temperature measurement (atm.), $Q_T$ a total amount of oxygen gas blown during a temperature measurement span ($Nm^3$), and $Q_d$ a total amount of dilution gas blown during a temperature measurement span ($Nm^3$).

It should be understood from FIG. 5, though the values may somewhat vary between the cases of the marks ○ and ●, a good linear relation is observed between $\Delta T$ and $\eta$ when $\Delta T$ is 50° C. or more in both the cases. In other words, a ratio of oxygen gas consumed for decarburization to blown oxygen gas ($\eta$) can be determined as a function of $\Delta T$, preferably as a linear function thereof. As a form of the function, a function of higher degree or of another kind may be employed. Whichever function may be used, a function close to a linear function is substantially obtained. In particular, the relationship between $\Delta T$ and $\eta$ may be expressed by the following formula ⑥:

$$\eta=j\times\Delta T+k \quad ⑥,$$

where, j and k are constant values determined by a refining furnace and can be determined from the past refining data.

As previously described, if $\eta$ is determined, then $\Delta[\%C]$ can be determined. Specifically, $\Delta[\%C]$ can be determined by the aforementioned formula ④. $\Delta[\%C]$ may be determined by way of determining $\eta$, $\Delta T$ and $P_{CO}$ during the course of computation but, needless to say, it may be determined directly by substituting a calculation logic or a calculation formula alternately without determining $\eta$, $\Delta T$ and $P_{CO}$.

FIG. 6, similarly to FIG. 5, shows the relationship between $\Delta T$ and $\eta$ when an oxygen gas ratio to blown gas is 20% or more and a [C] concentration is 0.15 mass % or less. The values of $\eta$ in FIG. 6 are smaller than those in FIG. 5 for the same $\Delta T$ value. However, a good linear relation is obtained between $\Delta T$ and $\eta$ at each refining furnace when $\Delta T$ is 50° C. or more and the above formula ⑧ is substantially accurate.

As should be understood from FIGS. 5 and 6, the formula ⑥ is accurate and, if the constants j and k are determined for each refining furnace and each [C] concentration range, $\eta$ can be determined with high accuracy. When $\eta$ is determined, [C] and [Cr] concentrations in molten steel can also be determined as it has been mentioned earlier. Note that, though the relationship between $\Delta T$ and $\eta$ is obtained on the premise that the threshold value of a [C] concentration is 0.25 mass % in FIGS. 5 and 6, if the relationship is obtained by further finely segmenting the range of [C] concentrations, the accuracy of $\eta$ is further improved.

Based on the information provided in FIGS. 5 and 6, it should be understood that, when $\Delta T$ is less than 50° C., the linear relation between $\Delta T$ and $\eta$ is disturbed and $\eta$ tends to decrease extremely, namely, the oxidation of [Cr] is likely to advance. This is likely because [Cr] oxidation is preferential in the aforementioned formula ④ when $\Delta T$ is 0 or less and the preference of [Cr] oxidation increases gradually when $\Delta T$ is less than 50° C.

In this light, an efficient decarburization is made possible by controlling $\Delta T$ to 50° C. or more in the decarburization-refining of chromium-contained molten steel under a reduced pressure. Operation factors used for controlling $\Delta T$ are T, [%C], $P_{CO}$ and [%Cr] that are included in the aforementioned formula ⑦. Among these, [%C] and [%Cr] likely cannot be effective operation factors because they are regulated by their own objective composition ranges. Then, T can be controlled by adding alloys containing elements, such as Si and Al, having a large oxidation calorific value or coolants. However, such addition likely does not produce sufficient effect because the addition causes the amount and composition of molten steel to vary and the estimation error of $\eta$ to increase. Therefore, the control of $P_{CO}$ is the most effective means for the control of $\Delta T$.

Next, two methods for controlling $P_{CO}$ can be provided; i.e., a method to control an atmospheric pressure P, and a method to control the oxygen gas amount to the total blown gas amount ratio. The decarburization reaction of chromium-contained molten steel under a reduced pressure is dominated by oxygen supply when a [C] concentration is 0.15 mass % or more and by diffusion when a [C] concentration is 0.15 mass % or less.

Meanwhile, in a vacuum refining furnace, an injected total gas amount has an upper limit for each atmospheric pressure due to the restrictions for avoiding splash or boiling and the injectable gas amount decreases as an atmospheric pressure decreases. In the region where decarburization is dominated by oxygen supply, to increase an oxygen gas amount is effective and to control an atmospheric pressure is disadvantageous.

For that reason, an arrangement effective for controlling $P_{CO}$ is: to control the ratio of an oxygen gas amount to a total blown gas amount in the region where a [C] concentration in molten steel is 0.15 mass % or more; and to control the ratio of an oxygen gas amount to a total blown gas amount and/or to control an atmospheric pressure in the region where a [C] concentration in molten steel is 0.15 mass % or less can be provided.

Next, a method for computing the transition of a [C] concentration ([%C]) at a diffusive decarburization term is described, where an oxygen gas ratio to blown gas is less than 20%, after a natural decarburization term is explained herein. In the decompression-refining of chromium-contained molten steel, an oxygen gas ratio to blown gas of less than 20% is generally applied at the time when [%C] is 0.1 mass % or less. That is, as indicated herein, the [%C] range of 0.1 mass % or less is the one where [C] is governed by diffusion in molten steel.

FIG. 7 shows the transition of the logarithmic value of [%C] with the passage of time at an oxygen gas to blown gas ratio of less than 20% when SUS 304 stainless steel (18 mass % Cr–8 mass % Ni) is decarburization-refined under a reduced pressure in a vacuum AOD furnace by a conventional method while the temperature measurement and sampling of the molten steel are carried out at the intervals of 2 to 5 min. The marks ○ and □ in FIG. 7 represent the data in the case of an AOD furnace 60 tons in capacity, the marks ● and ■ the data in the case of an AOD furnace 90 tons in capacity, the marks ○ and ● the data in the case of about 0.1 atm. in the degree of vacuum, and the marks □ and ■ the data in the case of about 0.2 atm. in the degree of vacuum.

From FIG. 7, it has been clarified that, though there are some differences in the gradient of the lines among those conditions, a good linear relation can be obtained between the time t from the commencement of a diffusive decarburization term and log[%C]. From this fact, it is possible in a diffusive decarburization term to determine the change of the logarithmic value (log[%C]) of a carbon concentration [%C] from the commencement of the diffusive decarburization term as a function proportionate to the time t from the commencement of the diffusive decarburization term, and to compute [%C] from the determined value immediately. To be more precise, it has been confirmed that [%C] at a diffusive decarburization term is expressed by the following formula ⑨ or ⑨':

$$\log[\%C] - \log[\%C]_0 = m \times t \qquad ⑨,$$

$$[\%C] = [\%C]_0 \times 10^{m \times t} \qquad ⑨',$$

where $[\%C]_0$ is a [C] concentration in molten steel at the time of the commencement of a diffusive decarburization term (mass %), t a time elapsed from the commencement of a diffusive decarburization term (min.), and m a constant value determined by a refining furnace and refining conditions and determined easily from the past refining data. Here, as a form of the function, a function of a kind different from the above function can also be adopted. Whichever function may be used, as a matter of course, the relationship between a carbon concentration [%C] and a time t is expressed similarly to the case where the change of the logarithmic value of a carbon concentration [%C] is determined as a function proportionate to the time t from the commencement of a diffusive decarburization term.

As has been explained herein above, Δ[%C] and [%C] can be determined sequentially by measuring molten steel temperatures continuously from the commencement of decompression. Specifically, Δ[%C] and [%C] can be determined by using the aforementioned formulae ① to ⑨.

EXAMPLES

SUS 304 stainless steel (18 mass % Cr–8 mass % Ni) was refined in a 60-ton vacuum AOD furnace shown in FIG. 1. 55 tons of crude molten steel ([C]: about 2.0 mass %, [Si]: 0.3 mass %, [Ni]: 7.5 mass %, [Cr]: 19 mass %, and temperature: about 1,450° C.) was charged into the vacuum AOD furnace and thereafter was blown from top and bottom.

The vacuum AOD furnace is a complex blowing type that is capable of top and bottom blowing. In the top blowing, a lance 22 mm in diameter with two holes was used and oxygen gas at a maximum of 4,000 Nm$^3$/hr. was supplied. In the bottom blowing, oxygen gas at a maximum of 5,000 Nm$^3$/hr. and inert gas composed of Ar gas and N$_2$ gas were supplied through five double-tube tuyeres (15 mm in inner-tube inner diameter and 20 mm in outer-tube outer diameter) installed at the side wall of the furnace. Along with the decrease of a [C] concentration due to the advance of decarburization reaction, an oxygen gas supply rate was lowered in the top blowing and an oxygen gas to blown gas ratio was also lowered in the bottom blowing. Molten steel was sampled at the time when a [C] concentration reached 0.5 mass % and thereafter decompression-refining was started.

In the decompression-refining, only inert gas was supplied for about 30 sec. from the commencement of the decompression and thereafter the oxygen gas ratio to blown gas was maintained at 20% or more, and, in the last term of decarburization where [%C] is about 0.1 mass % or less, the oxygen gas ratio was maintained at less than 20%.

During the refining, an image fiber was inserted into the Ar gas injecting hole 10 mm in inner-tube inner diameter of a double-tube tuyere provided at the furnace bottom and a luminance image was obtained. As the obtained luminance image included not only the luminance of molten steel viewed through Ar gas bubbles but also the luminance of the inner circumference face of the gas injection pipe and the skull (mushroom) formed at the tip of the pipe, the obtained luminance image was subjected to image processing to extract only the information on the true luminance of the molten steel and converted to a molten steel temperature. The Ar gas flow rate in the inner tube was set at 100 Nm$^3$/hr.

Table 1 shows, with regard to the operating conditions, the application or not of continuous temperature measurement at the refining under the atmospheric pressure and the reduced pressure, the application or not of the estimation of Δ[%C], [%C] and [%Cr], the application or not of the control of ΔT, and the method of controlling $P_{CO}$ in each [C] concentration range.

Here, Nos. 1 to 6 represent the examples according to the present invention and Nos. 7 to 12 represent the examples under conditions different from those of the present invention. In the examples Nos. 1 to 5, the molten steel temperature was controlled so that ΔT might be 0° C. or more when the [C] concentration was 0.5 mass % or more, the pressure in the refining vessel was controlled so that ΔT might be 30° C. or more when the [C] concentration was 0.2 to 0.5 mass %, and the pressure in the refining vessel and the oxygen gas ratio to blown gas were controlled so that ΔT might be 50° C. or more when the [C] concentration was less than 0.2 mass %. In the example No. 6, the estimation of η was applied but control of ΔT to a prescribed value or more was not applied.

On the other hand, in comparative examples Nos. 7 and 8, the continuous temperature measurement was applied but the estimation of Δ[%C], [%C] and [%Cr] was not applied, and in the other comparative examples, even the continuous temperature measurement was not applied.

TABLE 1

| Classification | No. | Application of continuous temperature measurement | Application of estimation of Δ[%C], [%C] and [%Cr] | Application of ΔT control | Decarburization-refining control | | |
|---|---|---|---|---|---|---|---|
| | | | | | [C] ≥ 0.5% | [C] ≥ 0.2% | [C] < 0.2% |
| Invention example | 1 | Yes | Yes | Yes | Molten steel temperature | Atmospheric pressure | Oxygen ratio |
| | 2 | Yes | Yes | Yes | Molten steel temperature | Atmospheric pressure | Oxygen ratio |
| | 3 | Yes | Yes | Yes | Molten steel temperature | Atmospheric pressure | Atmospheric pressure |
| | 4 | Yes | Yes | Yes | Molten steel temperature | Atmospheric pressure | Atmospheric pressure |
| | 5 | Yes | Yes | Yes | Molten steel temperature | Atmospheric pressure | Atmospheric pressure |
| Comparative example | 6 | Yes | Yes | No | — | — | — |
| | 7 | Yes | No | No | — | — | — |
| | 8 | Yes | No | No | — | — | — |
| | 9 | No | No | No | — | — | — |
| | 10 | No | No | No | — | — | — |
| | 11 | No | No | No | — | — | — |
| | 12 | No | No | No | — | — | — |

Table 2 shows, with regard to the operation results, the average ΔT, the [Cr] oxidation index, the refractory erosion index, the decarburization time index, and the refining cost index. Those indices are the values defined relative to the relevant values of the invention example No. 1 that are regarded as 100.

TABLE 2

| Classification | No. | Average ΔT in each [C] concentration range (° C.) | | | [Cr] oxidation index | Refractory index | Decarburization time index | Refining cost index |
|---|---|---|---|---|---|---|---|---|
| | | [C] ≥ 0.5% | [C] ≥ 0.2% | [C] < 0.2% | | | | |
| Invention example | 1 | 10 | 28 | 59 | 100 | 100 | 100 | 100 |
| | 2 | 18 | 34 | 67 | 94 | 94 | 95 | 91 |
| | 3 | 23 | 42 | 71 | 89 | 101 | 100 | 95 |
| | 4 | 26 | 45 | 75 | 85 | 105 | 103 | 96 |
| | 5 | 24 | 46 | 88 | 76 | 109 | 107 | 94 |
| | 6 | −5 | 18 | 47 | 104 | 98 | 97 | 102 |
| Comparative example | 7 | −7 | 16 | 43 | 109 | 103 | 114 | 109 |
| | 8 | 2 | 5 | 38 | 119 | 107 | 111 | 113 |
| | 9 | −6 | 16 | 33 | 125 | 114 | 125 | 130 |
| | 10 | −15 | 4 | 16 | 135 | 139 | 117 | 159 |
| | 11 | 28 | 34 | 72 | 93 | 135 | 129 | 125 |
| | 12 | 35 | 21 | 88 | 84 | 150 | 128 | 134 |

In the invention examples, as the Δ[%C] could continuously estimated by the continuously measured molten steel temperature and thus the [C] and [Cr] concentrations could be estimated, the decarburization-refining time could be shortened by controlling refining operations in accordance with those values and, also, the oxidation loss of [Cr] and the erosion of refractories could be lowered stably and, thus, the refining cost could be reduced.

On the other hand, in the comparative examples, the refining control in accordance with a molten steel temperature could not be secured, Δ[%C] and [C] and [Cr] concentrations could not be estimated and, therefore, the fluctuation of the actual molten steel temperature, the oxidation of [Cr] and the erosion of refractories advanced excessively, the decarburization time was prolonged, and the refining cost increased.

INDUSTRIAL APPLICABILITY

The present invention enables the decarburization-refining of chromium-contained molten steel that allows the oxidation loss of [Cr] and the erosion of refractories to be suppressed; the reduction of the refining cost; and an improvement in the productivity.

What is claimed is:

1. A method for decarburization-refining chromium-contained molten steel under one of an atmospheric pressure and a reduced pressure by blowing oxygen gas and inert gas into the molten steel, comprising the steps of:

a) refining the molten steel;
   b) determining, in sequence:
      i. a temperature of the molten steel during step (a) using at least one of an actual measurement and a computation of the temperature of the molten steel before step (a) and refining conditions,
      ii. [C] and [Cr] concentrations during step (a) using the at least one of the actual measurement and the computation from components of the molten steel before step (a) and the refining conditions,
      iii. a CO partial pressure $P_{CO}$ in an atmosphere during the refining from the total pressure P of the atmosphere, an oxygen gas supply rate and an inert gas supply rate,
      iv. a Hilty's equilibrium temperature $T_H$ from concentrations of [C] and [Cr] and $P_{CO}$, v. a difference ΔT between the molten steel temperature during step (a) and the Hilty's equilibrium temperature $T_H$; and c) controlling the refining conditions so that the ΔT may be at least a predetermined value.

2. The method according to claim 1, wherein the concentrations of [C] and [Cr] are determined during step (a) by a computation, from the molten steel components before step (a), a supplied oxygen amount as the total oxygen amount of an oxygen as and a solid oxygen source, a transition of the oxygen gas to a blown gas ratio and past refining data.

3. The method according to claim 2, wherein the concentration of [C] and [Cr] are determined during step (a) based on an analysis of an exhaust gas.

4. The method according to claim 1, wherein the concentrations of [C] and [Cr] are determined, in sequence, during step (a) by:
   i. setting the concentrations of [C] and [Cr] before step (a) as initial concentrations,
   ii. repeating a determination of a decarburization oxygen efficiency η as the function of the difference ΔT,
   iii. determining a decarburization rate and a [Cr] oxidation rate from the decarburization oxygen efficiency η and an oxygen gas supply rate, and
   iv. revising the concentrations of [C] and [Cr].

5. The method according to claim 1, wherein the decarburization-refining process under a reduced pressure includes at least three terms, comprising:
   i. a first term starting from a commencement of a decompression to a commencement of an oxygen gas blow,
   ii. a second term during which an oxygen gas ratio to blown gas is 20% or more after the first term, and
   iii. a third term during which an oxygen gas to blown gas ratio is less than 20% after the first term, and
further comprising the steps of:
   d) in the first term, determining, in sequence:
      i. an [O] concentration before the commencement of the decompression from a [C] concentration in the molten steel before the commencement of the decompression,
      ii. a [C] activity in the molten steel and the molten steel temperature before the commencement of the decompression,
      iii. a decarburized amount during the natural decarburization term as a function of the [O] concentration before the commencement of the decompression, and
      iv. a [Cr] concentration as a function of the decarburized amount during the natural decarburization term;
   e) in the second term, determining, in sequence, the concentrations of [C] and [Cr] during step (a) through the computation processes of
      i. setting the [C] and [Cr] concentrations at the time of the commencement of the oxygen decarburization term as the initial concentrations, and
      ii. repeating the processes of determining a decarburization oxygen efficiency η as the function of said difference ΔT, determining a decarburization rate and a [Cr] oxidation rate from the decarburization oxygen efficiency η and an oxygen gas supply rate, and revising the [C] and [Cr] concentrations; and
   f) in the third term, determining:
      i. a variation of a logarithmic value of the [C] concentration from the commencement of the diffusive decarburization term as a function proportionate to a time period t from the commencement of the diffusive decarburization term, and
      ii. the [Cr] concentration as a function of an oxygen supply rate and a decarburization rate.

6. The method according to claim 4, further comprising the steps of determining a decarburization rate Δ[C] and a [Cr] oxidation rate Δ[Cr] from the decarburization oxygen efficiency η and an oxygen gas supply rate $q_T$, and revising [C] and [Cr] concentrations y using the following formulae:

$$\Delta[C] = \eta \times q_T \times (1-R) \times 12/11.2/(10 \times Wm),$$

$$\Delta[Cr] = (1-\eta) \times q_T \times (1-R) \times 104/33.6/(10 \times Wm),$$

wherein Δ[C] and Δ[Cr] are the variations of [C] and [Cr] per unit time (mass %/min.), $q_T$ is an oxygen gas supply rate per unit time (Nm³/min.), R a secondary combustion rate (–), and Wm is a molten steel amount (ton).

7. The method according to claim 5, further comprising the steps of determining a decarburization rate Δ[C] and a [Cr] oxidation rate Δ[Cr] from the decarburization oxygen efficiency η and an oxygen gas supply rate $q_T$, and revising [C] and [Cr] concentrations y using the following formulae:

$$\Delta[C] = \eta \times q_T \times (1-R) \times 12/11.21/(10 \times Wm),$$

$$\Delta[Cr] = (1-\eta) \times q_T \times (1-R) \times 104/33.6/(10 \times Wm),$$

wherein Δ[C] and Δ[Cr] are the variations of [C] and [Cr] per unit time (mass %/min.), $q_T$ is an oxygen gas supply rate per unit time (Nm³/min.), R a secondary combustion rate (–), and Wm is a molten steel amount (ton).

8. The method according to claim 1, wherein the CO partial pressure $P_{CO}$ is determined in an atmosphere during step (a) from a total pressure P, an oxygen gas supply rate $q_T$ and an inert gas supply rate $q_d$ based on the following formula:

$$P_{CO} = P \times 2 \times q_T/(2 \times q_T + Q_d).$$

9. The method according to claim 1, wherein the Hilty's equilibrium temperature $T_H$ is determined using a value computed through the following formula:

$$T_H = \{-13.800/(-8.76 + \log([C]P_{CO}/[Cr]))\},$$

wherein units of parameters are K for $T_H$, mass % for [C] and [Cr], and atm. for $P_{CO}$.

10. The method according to claim 1, further comprising the step of controlling refining conditions so that ΔT may be 0° C. or more when the concentration of [C] in the molten steel is 0.5 mass % or more, 30° C. or more when the same is 0.2 mass % or more, and 50° C. or more when the same is lower than 0.2 mass %.

11. The method according to claim 10, further comprising the step of controlling ΔT by a control of the temperature of the molten steel when the concentration of [C] in the molten steel is 0.5 mass % or more.

12. The method according to claim 10, wherein ΔT is controlled via a control of the pressure in a refining vessel when the concentration of [C] in the molten steel is in the range from 0.2 to 0.5 mass %.

13. The method according to claims 10, wherein ΔT is controlled via a control of the pressure in a refining vessel and an oxygen gas to blown gas ratio when the concentration of [C] in the molten steel is less than 0.2 mass %.

14 b) continuously determining a decarburized amount ($\Delta[\%C]$) and a [C] concentration ([%C]) by using the measured molten steel temperature;
c) during steps (a) and (b), in a first term from the commencement of the decompression to the commencement of an oxygen gas blow, determining, in sequence:
  i. an [O] concentration ([O]cal) before the commencement of the decompression from the [C] concentration ([%C]s) in the molten steel before the commencement of the decompression,
  ii. a [C] activity (ac) in the molten steel and a measured molten steel temperature (T) before the commencement of the decompression, and
  iii. a decarburized amount ($\Delta[\%C]$) as a function of [O]cal,
d) during steps (a) and (b) and after the first term, in a second term during which an oxygen gas to blown gas ratio is 20% or more, determining, in sequence:
  i. a CO partial pressure $P_{CO}$ in an atmosphere at the time of a temperature measurement from a degree of vacuum (P) at the time of the temperature measurement,
  ii. a total amount of the oxygen gas ($Q_T$) blown during a span of the temperature measurement and a total amount of a dilution gas ($Q_d$) blown during the span of the temperature measurement,
  iii. a Hilty's equilibrium temperature from the computed [C] concentration ([%C]) in the molten steel,
  iv. a computed [Cr] concentration ([%Cr]) in the molten steel and $P_{CO}$,
  v. a difference ($\Delta T$) between the measured molten steel temperature T and the determined Hilty's equilibrium temperature,
  vi. a ratio ($\eta$) of the oxygen gas consumed for the decarburization to a blown oxygen gas as a function of $\Delta T$,
  vii. the amount of oxygen gas ($Q_{O2}$) consumed for the decarburization during the temperature measurement span from $\eta$ and $Q_T$ and a secondary combustion ratio (R), and
  viii. a decarburized amount ($\Delta[\%C]$) from $Q_{O2}$ and a molten steel amount (Wm); and
e) during steps (a) and (b) and after the first term, in a third term during in which an oxygen gas to blown gas ratio is less than 20%, determining the variation of the logarithmic value (log[%Cr]) of the [C] concentration [%C] from the commencement of the first term as a function proportionate to a time period t from the commencement of the first term.

15. The method according to claim 14, further comprising the steps of:
f) in the first term, determining;
  i. an [O] concentration ([O]cal) before the commencement of the decompression through formulae ② and ③, and
  ii. a carburized amount ($\Delta[\%C]$) through using a formula ①;
g) in the second term, determining, in sequence:
  i. a CO partial pressure $P_{CO}$ in an atmosphere at the time of the temperature measurement using a formula ⑧,
  ii. a difference ($\Delta T$) between the measured molten steel temperature T and the determined Hilty's equilibrium temperature using a formula ⑦,
  iii. a ratio ($\eta$) of oxygen gas consumed for the decarburization to blown oxygen gas using a formula ⑥, and
  iv. a decarburized amount ($\Delta[\%C]$) using a formula ④, and h) in the third term, determining the variation of the logarithmic value (log[%C]) of the [C] concentration [%C] using a formula ⑨:

$\Delta[\%C]=a\times[O]cal+b$      ①, $[O]cal=c+d\times[O]e\times10^{fo/To+g\times log[\%C]s+h}$      ②, $[O]e=1/(ac\times fo)\times10^{1,160/(To+273.15)-2.003}$      ③, $\Delta[\%C]=\eta\times Q_T\times(1-R)\times11.2/12/(10\times Wm)$      ④, $\eta=Q_{O2}/((1-R)\times Q_T)$      ⑤, $\eta=j\times\Delta T+k$      ⑥, $\Delta T=(T+273.15)-(-13.800/(-8.76+\log([\%C]P_{CO}/[\%Cr])))$      ⑦, $P_{CO}=P\times2\times Q_T/(2\times Q_T+Q_d)$      ⑧, $\log[\%C]-\log[\%C]O=m\times t$      ⑨, wherein:

T is the measured molten steel temperature (° C.).

To is the molten steel temperature before the commencement of decompression (° C.),

[%C]s is the [C] concentration in the molten steel before the commencement of decompression (mass %), ac is an activity of [C] in the molten steel before the commencement of the decompression, fo is an activity coefficient of [O] in molten steel before the commencement of the decompression, $\eta$ is a ratio of the oxygen gas consumed for the decarburization to the blown oxygen gas (−), $Q_T$ is a total amount of the oxygen gas blown during the temperature measurement span ($Nm^3$), R is a secondary combustion ratio (−), Wm is a molten steel amount (ton), $Q_{O2}$ is an amount of the oxygen gas consumed for the decarburization during the temperature measurement span ($Nm^3$), $\Delta T$ is a difference between an actual temperature and a Hilty's equilibrium temperature (° C.),

[%C] is a computed [C] concentration in the molten steel (mass %),

[%Cr] is a computed [Cr] concentration in the molten steel (mass %),

P is a degree of vacuum at the time of the temperature measurement (atm.), $Q_d$ is a total amount of a dilution gas blown during the temperature measurement span ($Nm^3$),

[% C]$_0$ is the [C] concentration in the molten steel at the commencement of the third term (mass %), t is a time elapsed from the commencement of the diffusive decarburization term (min.), and a, b, c, d, f, g, h, i, k and m are constant values determined by a refining furnace and refining conditions.

16. The method according to claim 14, wherein $P_{CO}$ is controlled so that $\Delta T$ may be 50° C. or more.

17. The method according to claim 16, wherein $P_{CO}$ is controlled by a control of a ratio of an oxygen gas to a blown gas when the [C] concentration in the molten steel is 0.15 mass % or more.

18. The method according to claim 16, wherein $P_{CO}$ is controlled by a control of at least one of a ration of an oxygen gas to a blown gas and of an atmospheric pressure when the [C] concentration in the molten steel is 0.15 mass % or less.

* * * * *